(12) United States Patent
Bosman

(10) Patent No.: US 7,210,671 B2
(45) Date of Patent: May 1, 2007

(54) FAN-ASSISTED WET COOLING TOWER AND METHOD OF REDUCING LIQUID LOSS

(75) Inventor: Peter B Bosman, Littleton, CO (US)

(73) Assignee: Knight Piésold Energy Inc., Littleton, CO (US)

( * ) Notice: Subject to any disclaimer, the term of this patent is extended or adjusted under 35 U.S.C. 154(b) by 181 days.

(21) Appl. No.: 11/134,779

(22) Filed: May 20, 2005

(65) Prior Publication Data

US 2005/0258556 A1   Nov. 24, 2005

Related U.S. Application Data

(60) Provisional application No. 60/573,652, filed on May 22, 2004.

(51) Int. Cl.
  *B01F 3/04*   (2006.01)
(52) U.S. Cl. .............. 261/29; 261/30; 261/66; 261/96; 261/97; 261/109; 261/110; 261/DIG. 11
(58) Field of Classification Search .......... 261/29, 261/30, 66, 96, 97, 102, 109, 110, 128, 129, 261/130, 131, 153, DIG. 11
See application file for complete search history.

(56) References Cited

U.S. PATENT DOCUMENTS

| | | | | |
|---|---|---|---|---|
| 1,948,980 A | * | 2/1934 | Coffey | 261/117 |
| 3,608,873 A | * | 9/1971 | Furlong | 261/30 |
| 3,903,212 A | | 9/1975 | Lefevre | 261/30 |
| 4,164,256 A | | 8/1979 | Kelp | 165/125 |
| 4,196,157 A | * | 4/1980 | Schinner | 261/155 |
| 4,235,571 A | * | 11/1980 | Larinoff | 417/1 |
| 5,407,606 A | * | 4/1995 | Bowman | 261/109 |
| 6,499,728 B2 | * | 12/2002 | Menzel et al. | 261/109 |

FOREIGN PATENT DOCUMENTS

| | | |
|---|---|---|
| GB | 1 455 544 | 11/1976 |
| GB | 1 467 563 | 3/1977 |
| WO | 03/01583 | 3/2002 |

* cited by examiner

*Primary Examiner*—Scott Bushey

(57) ABSTRACT

The invention provides an improved natural draft cooling tower (10) having improved cooling capability and reduced liquid losses of evaporation and blow-out. To this end, the distribution of hot liquid to the packing assembly within the tower is increased around the perimeter zone of the packing assembly and reduced within the remaining packing assembly of the tower (24). A plurality of air injector fans (30) spaced circumferentially in the air inlet (20) between the shell (12) support columns (14), together with reduced air resistance through reduced hot liquid distribution to tower interior, produce increased air rates (32) and (34) resulting in improved cooling capability and reduced evaporation loss. With improved cooling, further reduction in evaporation, if required, can be achieved with a hot liquid by-pass (52).

23 Claims, 7 Drawing Sheets

FAN-ASSISTED WET COOLING TOWER AND METHOD OF REDUCING LIQUID LOSS

CROSS-REFERENCE TO RELATED APPLICATIONS

This application is entitled to the benefit of Provisional Patent Application Appl No. 60/573,652, filed May 22, 2004

FIELD OF INVENTION

This invention relates to wet natural daft cooling towers. More particularly it relates to a method of modifying a wet natural draft cooling tower. It further relates to a wet natural draft cooling tower and a method of operating a wet natural draft cooling tower.

BACKGROUND—DESCRIPTION OF PRIOR ART

Natural draft cooling towers are predominantly used in the power generation industry for providing cooled circulating water to the condensers. The degree to which the circulating water is cooled by the cooling tower governs the performance of the condenser, the backpressure acting on the steam turbine, the turbine cycle heat rate and coal burnt for a given electricity output. Natural draft cooling towers can either be dry or wet, the more common type being wet, in which heat transfer from the circulating water being cooled, is largely through evaporation.

Natural draft cooling towers include a shell which is supported above a cold water collecting sump such that an annular air inlet opening is defined between the lower edge of the shell and the sump through which air can enter the shell. Air flow through the air inlet opening and upwardly through the shell is affected by a reduction in density of the column of air within the shell.

Tower performance or capability can be improved by replacing natural draft with forced draft utilizing fans. A number of different types of fan-assisted natural draft cooling towers have been designed and built. Fan mechanisms have been located in the air inlet opening with near horizontal fan shafts. In order to maintain or improve tower performance mechanical draft provided by the fans has to be equal to or greater that the natural draft it replaces, which requires large diameter fans. A disadvantage of this arrangement is that with fan blades positioned in a near vertical plane, they are directly subject to the adverse affect of wind and are at risk of destruction by high winds. U.K. patent 1 455 544 to Hamon—Sobelco (1975) attempts to overcome this problem by proposing fans located within the cooling tower shell. For an existing natural draft cooling tower, this proposal would require extensive modifications to the cooling tower and would be impractical and involve high cost.

U.K. patent 1 467 563 to Hamon—Sobelco (1975) and U.S. Pat. No. 3,903,212 to Lefevre propose fans located outside the cooling tower with vertical fan shafts, that is horizontally mounted fan blades that overcomes the risk of wind damage and makes the fans readily accessible. In both these patents it is envisaged that with the fans in operation, towers cannot operate in natural draft mode. U.S. Pat. No. 3,903,212 does allow operation in natural draft mode, but only when the fans are inoperative and air inlet louvers, which have to be closed for fan operation, are opened. For application to existing cooling towers both these proposals would also require extensive modification to the tower to provide the required external fan deck and for most applications this too would be impractical and involve high cost.

U.S. Pat. No. 4,164,256 to Kelp (1979) reverts to large diameter fans with near horizontal fan shafts located in the tower air inlet with closable openings located between the annular inlet fan openings. This arrangement does not overcome the problem of wind damage to the fan blades. It does however allow concurrent mechanical draft provided by the fans and natural draft air flowing through the closable openings. For application to an existing cooling tower, this proposal would also require extensive modification to the tower air inlet and furthermore suffers from the disadvantage of wind damage risk to the fan blades.

South African patent application 2003/1583 to KPE LLC (2003) provides a cooling tower which has a primary operating mode in which air is drawn into the tower by natural draft and a secondary operational mode in which air flow into the tower is supplemented by mechanical draft. In the secondary operational mode each air inlet path has a natural draft inlet through which air can be drawn by natural draft and spaced therefrom a supplementary inlet with which at least one fan is associated and through which air can be drawn into the air inlet path by operation of the fan. A disadvantage of this proposal is that it has to rely on the supplemental air provided by the fans to feed air under pressure into the cooling tower. To ensure that this occurs, the fans have to be configured when operating to discharge air into the air inlet opening at velocities of between 15 and 20 m/s.

This is a hit and miss approach. In the first instance, fan power is directly proportional to the cube of air velocity which results in high fan power requirements. Secondly it is assumed that provided sufficient air pressure is created by the fans, the natural draft will be supplemented without any regard to where the air into the tower is actually going. Simply sticking fans on to a natural draught cooling tower will not necessarily have the desired effect of improving cooling performance. Forcing cold air into a natural draft cooling tower without due consideration of hot water distribution within the tower and what the air is doing inside the tower could result in cold air by-pass through the heat transfer medium within the tower. If cold air by-pass occurs this has the effect of reducing natural draft and will reduce tower performance.

It is often the case that circumstances under which the power station generates and sells its power, changes, invariably requiring a higher output and better efficiency. These in turn lead to a requirement for better tower performance or capability. With wet cooling towers, improving tower performance results in increased liquid loss through evaporation.

While the amount of water lost through evaporation is a comparatively small percentage of the circulating water rate, typically about 1.5% to 2.0%, the quantity of circulating water is large, resulting in loss due to evaporation amounting to many millions of gallons per annum. In addition to evaporation losses from the cooling process, blow-out from the tower air inlet further increases the water lost from the system.

Blow-out losses occur on natural draft cooling towers of the counterflow type. Blow-out occurs, during windy conditions, at the base of the shell at the top of the air opening where water leaving the fill in the form of fine rain droplets, close to the perimeter of the shell, can easily be blown out of the tower. Furthermore, strong external wind can produce negative pressures on the leeward side of the tower, resulting in not only fine rain droplets being sucked out of the tower but also a loss of natural draft which adversely affects tower performance. Although not as significant as evaporation losses, blow-out loss can amount to as much as 0.2% of the cooling water circulation rate. To minimize this effect, wind shields have in the past been located around the base of the tower. However as wind shields should not restrict airflow into the tower, their effectiveness at eliminating blow-out has not been entirely successful.

In countries such as Australia and South Africa, water is a scarce commodity and is often the inhibiting factor in further power generation, unless expensive dry cooling is adopted. With increasing demands on existing power stations to improve efficiency and to generate more power, availability of water for cooling becomes a limiting factor.

In this specification, the terms "comprises", "comprising" or similar terms are intended to mean a non-exclusive inclusion, such that a method, system or apparatus that comprises a list of elements does not include those elements solely, but may well include other elements not listed.

OBJECTS OF THE INVENTION

It is an object of the present invention to address or ameliorate one or more of the aforementioned problems of the prior art.

It is a preferred object of the present invention to provide a natural draft cooling tower and method of operation that improves cooling tower performance during the hotter periods of the year and achieves moderate saving in evaporation loss.

It is another preferred object to provide a natural draft cooling tower and method of operation that, if required, significantly reduces evaporation losses during the cooler periods of the year.

A further preferred object is to provide a means of minimizing or eliminating water blow-out from the air inlet of the cooling tower.

A yet further preferred object is to provide a means of reducing the negative effect on performance of external wind.

A further preferred object is to provide an improved natural draft cooling with minimum modification to the existing natural draft cooling tower.

SUMMARY OF THE INVENTION

The present invention is generally directed towards improving cooling tower performance or capability and reducing water loss through a wet natural draft cooling tower by reducing evaporation losses without adversely affecting the towers capability with regard to power generation and by significantly reducing blow-out losses. This is accomplished by supplementing the natural draft through the tower with forced draft, provided by air injector fans arranged around the tower perimeter to increase mass air flow through the tower and optionally by the incorporation of a hot water by-pass.

Accordingly, in one form, although not necessarily the broadest form, the invention resides in an improved natural draft cooling tower comprising:

a cooling tower shell having at its upper end an open air discharge and its lower edge supported on columns above a cold liquid sump to provide an annular inlet air opening such that air can enter the cooling tower;

an air liquid contact packing assembly within the tower shell;

a hot liquid distribution means above the packing assembly; and a plurality of air injector fans positioned below the shell lower edge within the annular inlet air opening, wherein the fans are upwardly tilted to direct injected air into a perimeter zone of the air liquid contact packing assembly.

The improved natural draft cooling tower preferably further comprises a hot liquid by-pass means enabling some of the hot liquid to be diverted from the hot liquid distribution means directly into said cold liquid sump.

Suitably, the hot liquid by-pass means comprises a hot liquid by-pass tower having an adjustable gate to vary the flow of hot liquid diverted from the hot liquid distribution means directly into said cold liquid sump.

The improved natural draft cooling tower may further comprise:

a first temperature sensor for measuring the ambient air temperature; and a second temperature sensor for measuring a mixed cold liquid temperature, said mixed cold liquid temperature being the temperature of the liquid in the cold liquid sump when some of the hot liquid from the hot liquid distribution means has been diverted directly into the cold liquid sump.

Suitably, a position of the adjustable gate and the flow of hot liquid diverted from the hot liquid distribution means above the packing directly into said cold liquid sump are varied in response to the mixed cold liquid temperature measured by the second temperature sensor.

The air injector fans may be between 3 ft and 13 ft in diameter and preferably between 3 ft and 7 ft in diameter or between 7 ft and 13 ft in diameter.

Preferably, the air injector fans are positioned between the columns near the top of the annular inlet air opening and below the air liquid contact packing assembly within the tower shell.

Between one and three air injector fans may be positioned between each pair of columns. Alternatively, between one and three air injector fans are positioned between each second or third pair of columns.

Preferably, the improved natural draft cooling tower further comprises drift eliminators in the tower shell above the hot liquid distribution means to minimize drift loss.

In another form, the invention resides in a method of enhancing cooling performance and reducing liquid losses of a natural draft cooling tower, said cooling tower comprising a shell for a natural draft cooling tower having at its upper end an open air discharge and its lower edge supported on columns above a cold liquid sump to provide an annular inlet air opening such that air can enter said cooling tower, an air liquid contact packing assembly within the tower shell and a hot liquid distribution means above the packing assembly, said method including the steps of:

positioning a plurality of air injector fans below the shell lower edge within said annular inlet air opening; and upwardly tilting the plurality of air injector fans to direct injected air into a perimeter zone of the air liquid contact packing assembly.

The method may further include the step of diverting some of the hot liquid from said hot liquid distribution means above the packing directly into said cold liquid sump via a hot liquid by-pass means.

Suitably, the method further includes the steps of:

measuring the ambient air temperature with a first temperature sensor;

reducing a proportion of the hot liquid diverted from the hot liquid distribution means above the packing directly into said cold liquid sump via a hot liquid by-pass means to zero when the ambient temperature is above an upper threshold temperature;

reducing the air injected into a perimeter zone of the air liquid contact packing assembly by the plurality of air injector fans to zero when the ambient temperature is below a lower threshold temperature; and operating the natural draft cooling tower with both the plurality of air injector fans and the hot liquid by-pass means active when the ambient temperature is between the lower and upper threshold temperatures.

Suitably, the method further includes the steps of:

measuring a mixed cold liquid temperature with a second temperature sensor, said mixed cold liquid temperature being the temperature of the liquid in the cold liquid sump when some of the hot liquid from the hot liquid distribution means has been diverted directly into the cold liquid sump; and varying the proportion of the hot liquid diverted from the hot liquid distribution means above the packing directly into said cold liquid sump via a hot liquid by-pass means and the amount of air injected into a perimeter zone of the air liquid contact packing assembly by the plurality of air injector fans depending on the ambient air temperature and/or the mixed cold liquid temperature.

Suitably, the method further includes the steps of increasing the distribution of hot liquid within the tower above the perimeter zone of the packing assembly and decreasing the hot liquid distribution above the remaining packing assembly within the tower.

Optionally, the distribution of hot liquid within the tower above the perimeter zone of the packing assembly is increased by increasing the number of sprayers of the hot liquid distribution means in the perimeter zone. Alternatively, the distribution of hot liquid within the tower above the perimeter zone of the packing assembly may be increased by increasing the size of nozzles of sprayers of the hot liquid distribution means in the perimeter zone.

The method may further include the step of increasing air through the perimeter zone with air injected by the air injector fans, thereby maintaining an optimum ratio of air to hot liquid and increasing the natural draft to match the increased air from the fan injectors.

The method may further including the step of creating positive air pressure via the air injector fans to overcome negative air pressure caused by external wind around a leeward side of the tower thereby preventing liquid loss through air by-pass, reduction of natural draft and/or blow-out.

Suitably, the steps of increasing the distribution of the hot liquid above the perimeter zone and decreasing the distribution of hot liquid above the remaining packing assembly result in reduced air resistance thereby increasing natural draft and the ratio of air to hot water in the remaining packing.

The method may further include the step of reducing the hot liquid from said hot liquid distribution means above the remaining packing assembly to increase the natural draft through said cooling tower thereby increasing the ratio of air to hot liquid and reducing liquid losses through evaporation.

Further features of the present invention will become apparent from the followed detailed description.

BRIEF DESCRIPTION OF THE DRAWINGS

By way of example only, preferred embodiments of the invention will be described more fully hereinafter with reference to the accompanying drawings, wherein.

DETAILED DESCRIPTION OF THE PREFERRED EMBODIMENTS

Figure 1:
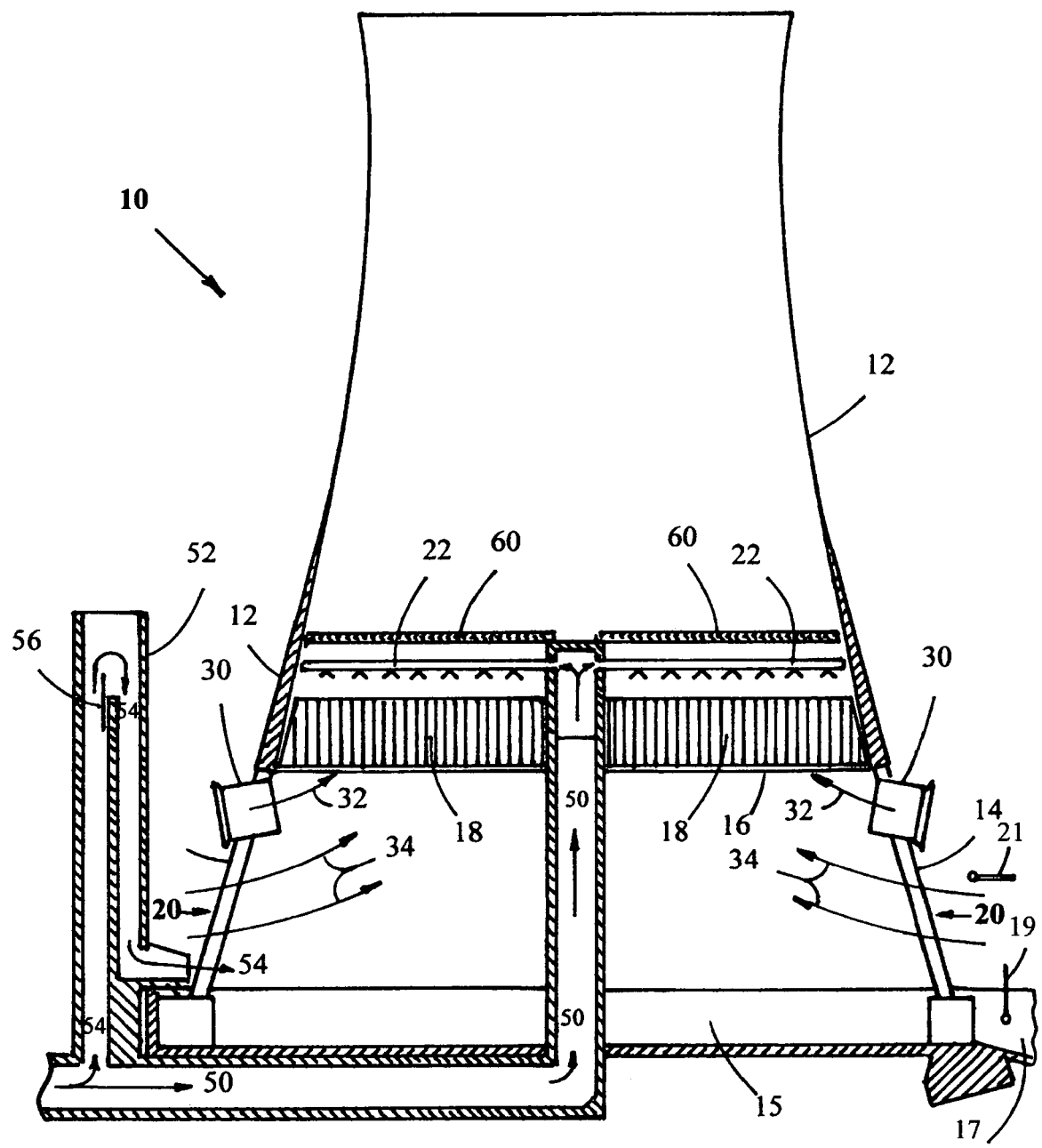
FIG. 1 shows a sectional elevation view of a natural draft cooling tower in accordance with an embodiment of the invention.

In general, the colder the circulating water temperature returned by the tower to the condenser, the lower the backpressure, resulting in higher power generation efficiency.

The design duty set for the cooling tower is based on a number of factors such as overall heat load to be handled by the tower, annual ambient conditions and capital cost. The design duty for the cooling tower can be set for the average ambient condition which implies that ambient conditions will exceed the design condition for 50% of the year, or for a more onerous condition, say, in which the ambient condition will not be exceeded for more than 5% of the year. In the case of the 50% condition, a much smaller cooling tower will be required to meet the duty, thereby minimizing initial capital cost but at the expense of ongoing operating cost.

The vehicle for heat transfer in a cooling tower consists of the fill, the sprayers and the rain below the fill, generally referred to as the air liquid contact packing assembly or pack. For heat balance, the following relationship, per unit area of pack and per unit time, applies:

Heat lost by water=heat transferred by pack=heat gained by air or:

Heat lost by water=heat gained by air, which may be expressed mathematically as:

$$LC(T_{wi}-T_{wo})=G(H_o-H_i)-GC(R_o-R_i)T_{wo}$$

Where:
L=Mass water flow per unit plan area of pack, kg/m^2/hr
G=Mass airflow per unit plan area of pack, kg/m^2/hr
C=Specific heat of water, kJ/(kg degC)=1
$T_{wi}$=Inlet hot water temperature degC
$T_{wo}$=Exit cold water temperature degC
$H_o$=Enthalpy of exit air-water vapor mixture, kJ/kg
$H_i$=Enthalpy of inlet air-water vapor mixture, kJ/kg
$R_o$=Moisture content of outlet air kg/kg
$R_i$=Moisture content of inlet air kg/kg The heat load which the cooling tower has to handle is represented by the left hand side of the above equation. It should be noted that the cooling tower, irrespective of its pack, will always reject whatever heat load it receives, it simply does so by returning a lower or higher inlet and exit cold water temperature.

In the right hand side of the above equation, the values of Hi and Ri are fixed for the specific inlet air condition. The relationship of Ho and Ro are complicated as not only do they depend on the values of Two and Twi, but Ho also depends on Ro. The value of G also varies with a change in the values of Two and Twi while the net evaporation from the system is given by G C (Ro−Ri).

From the above heat balance equation, it can be shown that any attempt to reduce Two and Twi by improving the heat transfer capability of the pack also leads to an increase in the evaporation loss from the system.

In the above heat balance equation, the extreme right hand term G C (Ro−Ri) Two is small in comparison to the term G(Ho−Hi). Ignoring it in order to simplify the heat balance equation, for illustration purposes only, it can be seen that increasing the value of G will result in a decrease in the value of (Ho−Hi) to maintain an energy balance.

The net effect, even after accounting for the term −G C (Ro−Ri) Two is that by increasing G, an increasing reduction in evaporation loss from the system can be achieved as the ambient conditions, wet and dry bulb temperatures, reduce from summer to winter.

In a natural draft cooling tower, a narrow zone around the shell perimeter can represent as much as 10% to 20% of the fill volume available for cooling. By increasing the water loading in this perimeter zone, about 20% to 40% of the total heat load can be concentrated into the perimeter zone. Being located around the shell perimeter, this zone can readily be provided with forced mechanical draft air to achieve maximum liquid cooling. One aspect of the invention therefore comprises a plurality of air injector fans, located externally, immediately below the shell skirt to provide the required mechanical draft. This is a different concept to that advocated in the prior art and disclosed in the cited references.

Having small to moderate diameter fans, located at the top of the air opening, minimum interference to the natural draft occurs. With about 80% to 90% of the fill volume within the tower available for cooling the remaining, about, 60% to 80% of the heat load, improved liquid cooling by natural draught can also be achieved. An added advantage is that by placing air injector fans at the top of the air inlet, blow-out can effectively be eliminated as the forced draft from the fans blow the fine rain droplets leaving the perimeter zone of the air liquid contact packing assembly back into the tower.

External wind also has an effect on the performance of a natural draft tower in that it creates negative pressures on the leeward side of the shell resulting in air-by-pass areas around the internal perimeter of the shell which reduce tower overall performance. A further advantage of the invention is that it reduces this wind effect on the tower performance by providing positive pressure to counter the leeward negative pressure created by external wind thereby eliminating the air by-pass.

The invention therefore not only provides a means to improve cooling tower performance or capability, it also reduces water loss from the tower, by, a) reducing evaporation through increasing air rate and b) by eliminating blow-out. In addition the invention also incorporates a further refinement which may be incorporated if a further reduction in evaporation loss is required.

Again referring to the simplified energy balance equation, the left hand side of the equation represents the heat load as received from the condenser and comprises a circulating water flow rate multiplied by the cooling range. This can be manipulated by reducing the flow rate to the tower by means of a hot liquid by-pass in which case the cooling tower, which always has to reject the full heat load, adjusts the cooling range, to compensate.

A lower water flow rate through the cooling tower results in reduced air resistance producing a lower cold water temperature, which partly compensates for the higher cooling range, that is, a higher inlet hot water temperature. Lower air resistance also results in a higher air rate through the tower which as we have shown above reduces evaporation. As evaporation is also a function of flow rate through the tower, a combined reduction in evaporation occurs.

While the cooling tower is achieving a low cold water temperature, the reduction in flow rate to the tower was achieved by by-passing the difference in flow rate straight back into the cooling tower cold liquid sump. This hot water being at the same temperature as the inlet hot water to the cooling tower, combines with the cooling tower's cold water, to return a mixed cold water temperature to the condenser to match the cooling range originally set by the condenser heat load.

Although a reduction in evaporation loss has occurred through the above process, it has resulted in a higher mixed cold water temperature than would have been the case without the hot water by-pass. This can however be compensated for by increasing the air rate around the tower periphery through the forced draft provided by the air injector fans.

Maximum reduction in water loss through evaporation and blow-out can therefore be achieved by operating the tower with a combination of forced draft and hot water by-pass, particularly during those times of the year when low ambient conditions pertain.

This can best be illustrated by considering the following example.

A natural draft cooling tower serving a 350 MW generator is required to cool 9.0 million gallons per hour through a cooling range of 23.0 deg F. at an ambient dry bulb temperature of 60 deg F. and a wet bulb temperature of 50 deg F. for which a cold water temperature of 75 deg F. is required. The tower is sized for this duty and results in an evaporation loss at the specified ambient conditions, of 152,324 gallons per hour.

By applying forced draft via the air injector fans to supplement the natural draft, the cold water temperature can be reduced to 71.8 deg F. and the evaporation rate is reduced to 151,394 gallons per hour.

As the cold water temperature is less than required, the hot water by-pass can be operated to bring the mixed cold water temperature back to 75 deg F. To do this it is found that a by-pass of 29% of flow will achieve a combined cold water temperature of 75 deg F. with a resulting evaporation loss of 148,606 gallons per hour. Net saving in evaporation of 3,718 gallons per hour has therefore been achieved without compromising tower performance or capability.

This saving in evaporation has however been achieved with a power penalty for operating the forced draft fans. The above example is based on a generating output of 350 MW while, total power drawn by the fans amounts to 418 kW. If the MW output is equated to the full evaporation loss, then the fan power is equivalent to an evaporation loss of 182 gallons per hour which still leaves a positive saving in water consumption of 3,536 gallons per hour.

The above example illustrates the effectiveness of the present invention at the design duty of the cooling tower which in this case was set at the average annual ambient condition. This implies that for 50% of the year, ambient conditions will be colder allowing for increased evaporation loss savings. For example, it can be shown that at a dry bulb temperature of 41 deg F. and a wet bulb temperature of 38 deg F., evaporation loss would be 131,180 gallons per hour for a cold water temperature of 67 deg F. Applying both forced draft and hot water by-pass to this operating condition for a cold water temperature of 75 deg F. results in an evaporation loss of 116,763 gallons per hour, that is a saving of 14,417 gallons per hour.

Conversely, during the hot summer months, there will be no advantage in operating the hot water by-pass as cold water temperatures, even with the operation of the forced draft fans, will still be in excess of the design cold water temperature of 75 deg F. However, depending upon the ambient conditions, saving in evaporation will still be possible with the increase in air rate provided by the forced draft air injector fans. Ambient conditions might, for example, be at a dry bulb temperature of 85 deg F. with a wet bulb temperature of 75 deg F. For this condition the cooling tower would return a cold water temperature of 90 deg F. at an evaporation rate of 166,838 gallons per hour. With forced draft fan operation an improvement in cold water temperature to 88.5 deg F., at an evaporation rate of 165,822 gallons per hour, would be possible. In this case the lower back pressure that would result from the lower cold water temperature would be preferable to decreasing the evaporation rate at the expense of a higher cold water temperature.

It is envisaged that except for very cold weather where ice formation may be a problem, the cooling tower will be operated with both forced draft from the air injector fans and hot water by-pass mode for most of the year. For the hotter times of the year, hot water by-pass will be reduced to zero while for the colder times of the year, forced draft fan operation will be reduced to zero. For the fill operation mode, it is envisaged that an automatic system, controlled by the temperature of the ambient air measured by a first temperature sensor and the mixed cold water temperature measured by a second temperature sensor will be installed. A proportion of the hot liquid diverted from the hot liquid distribution means above the packing directly into said cold liquid sump via a hot liquid by-pass means will be reduced to zero when the ambient temperature is above an upper threshold temperature and the air injected into a perimeter zone of the air liquid contact packing assembly by the plurality of air injector fans will be reduced to zero when the ambient temperature is below a lower threshold temperature. When the ambient temperature is between the lower and upper threshold temperatures, the natural draft cooling tower will be operated with both the plurality of air injector fans and the hot liquid by-pass means active. With an automatic system, maximum water savings in the order of 5% to 8% of circulating water rate will be possible. For the above example this would amount to about 30 million gallons per annum or the equivalent of about 17.5 million MW hrs generating output.

An advantage of the invention is that irrespective of where the original duty was set for the cooling tower, forced draft fan operation can be used to improve cooling for that part of the year during which ambient conditions exceed the design duty, with reduced saving in evaporation loss, but for the remainder of the year, by utilizing both forced draft and hot water by-pass operation, savings in evaporation loss can be maximized and significant savings can be achieved.

In the drawings, reference numeral 10 refers generally to a natural draft cooling tower in accordance with an embodiment of the invention. The cooling tower 10 includes a tower shell 12 formed of reinforced concrete and a plurality of circumferentially spaced columns 14 to support the lower edge 16 of the tower shell 12 clear of a cold liquid sump 15 and thereby define an annular inlet air opening 20 through which air can enter the shell 12.

Figure 3:
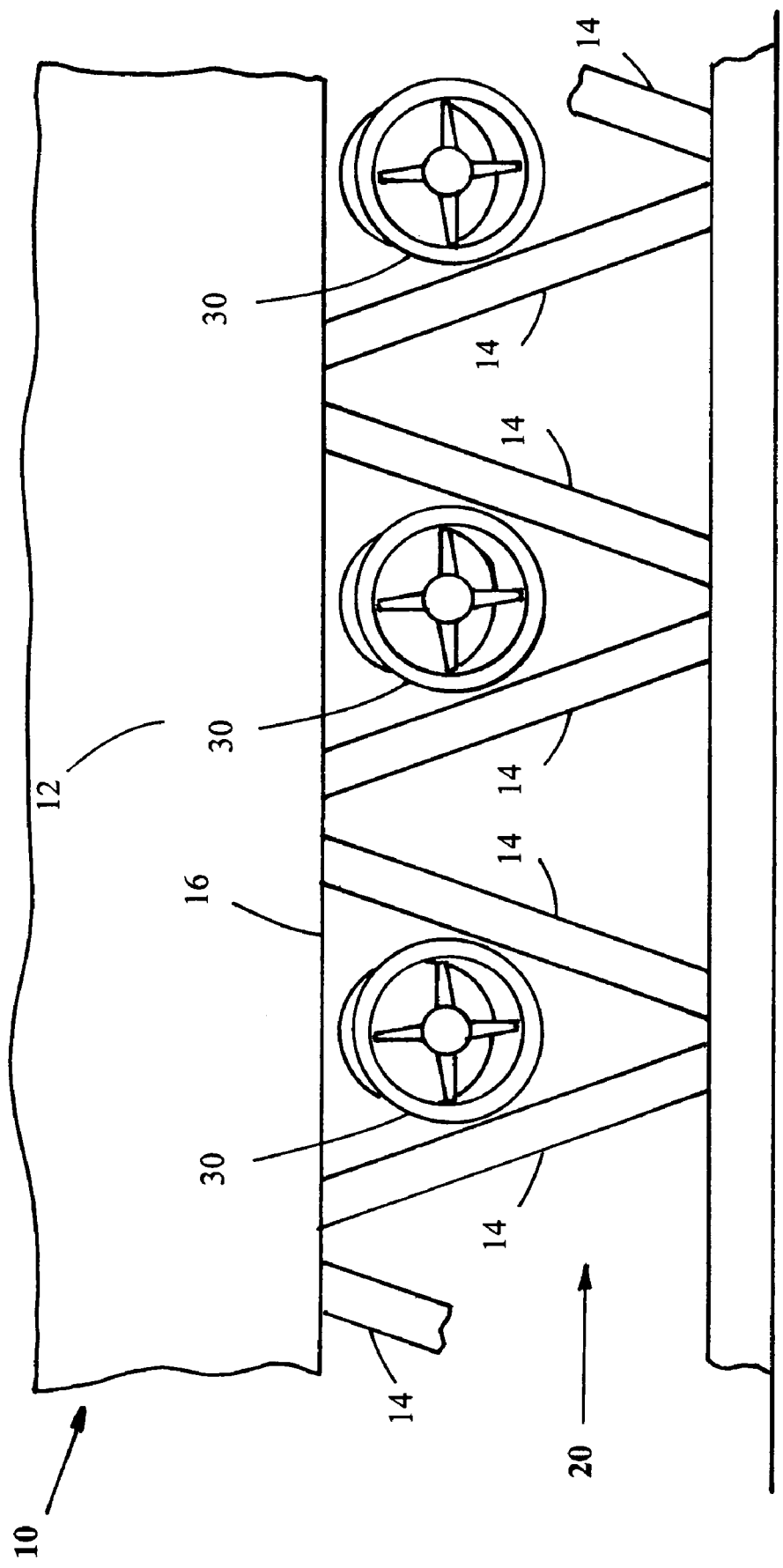
FIGS. 3, 4 & 5 show an elevation view on the annular tower air opening each having different support column geometries and various circumferentially spaced fan arrangements in accordance with embodiments of the invention.
Figure 4:
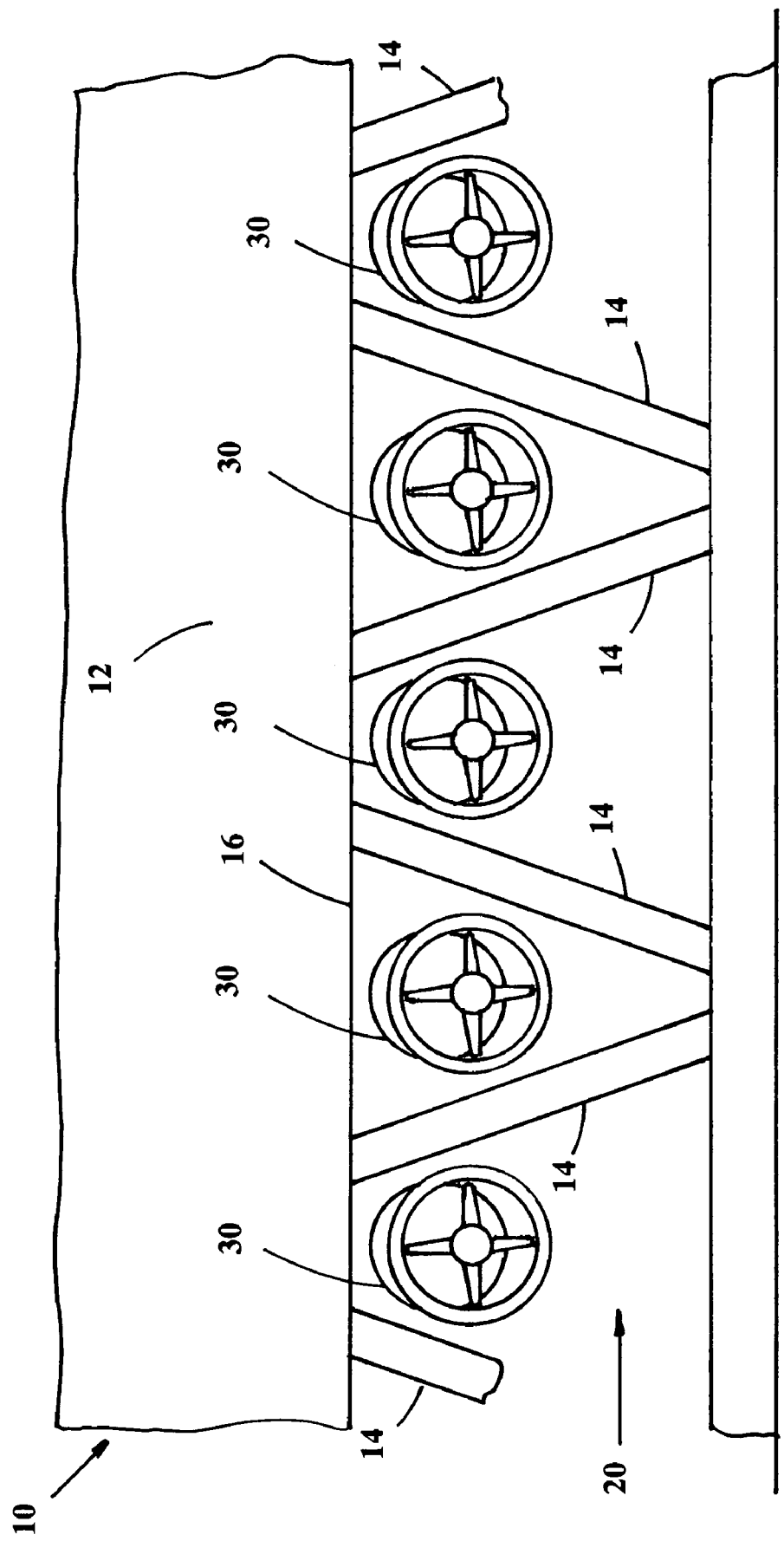
Figure 5:
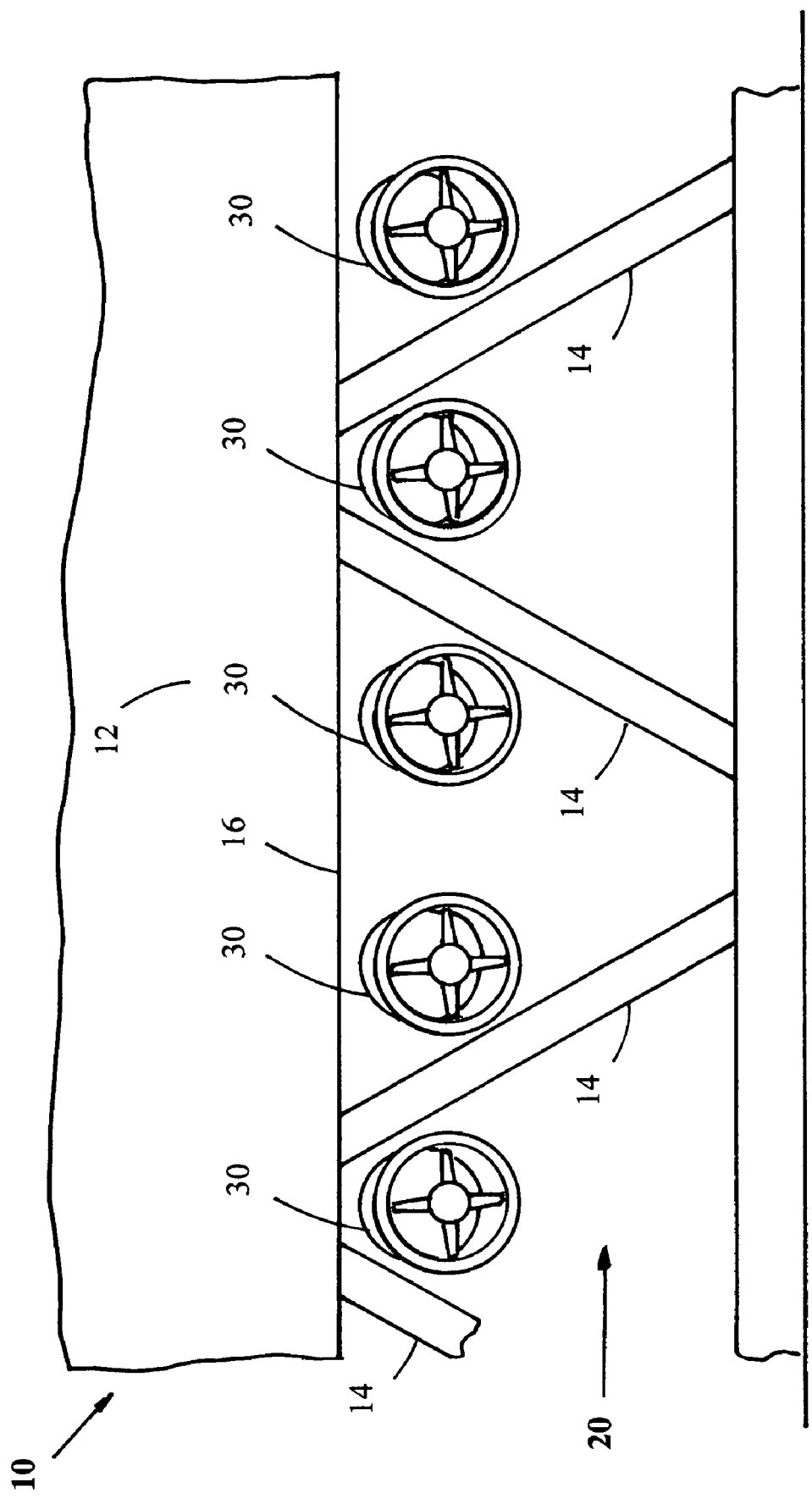

The columns 14 are generally arranged in diagonal pairs, as shown in FIGS. 3–5.

The cooling tower 10 includes a plurality of circumferentially spaced fan arrangements in the form of air injector fans 30. The preferred positioned of fans 30 is below the lower edge 16 of the tower shell 12. Typically each fan 30 may be inclined away from the horizontal, i.e. tilted upwardly, to direct the fan draft 32 into the perimeter zone of the air liquid contact packing assembly or fill 18.

Typically each pair of diagonal columns 14 may be provided with one, two or three air injector fans 30 as shown in FIGS. 3, 4 & 5 to suit the geometry of the diagonal columns 14. Alternatively, if required, fewer fans may be provided, for example, one fan for every second or third pair of diagonal columns 14.

The fans 30 can be of relatively small diameter, typically 3 ft to 7 ft. This permits the fan motors to be directly coupled to the fans thereby decreasing maintenance and allowing for near horizontal axis of rotation without creating bearing problems. Small to moderate diameter fans 30, typically 7 ft to 12 ft or 13 ft can also be used and for this size the motors can still be directly coupled to the fans through a single reduction geared drive. Alternatively, belt drives may be employed.

In addition, because of the relatively small area of the fans 30, they have minimal effect on air flow 34 into the cooling tower under purely natural draft conditions. In any event air can flow through the fans 30 when they are not in operation.

Figure 2:
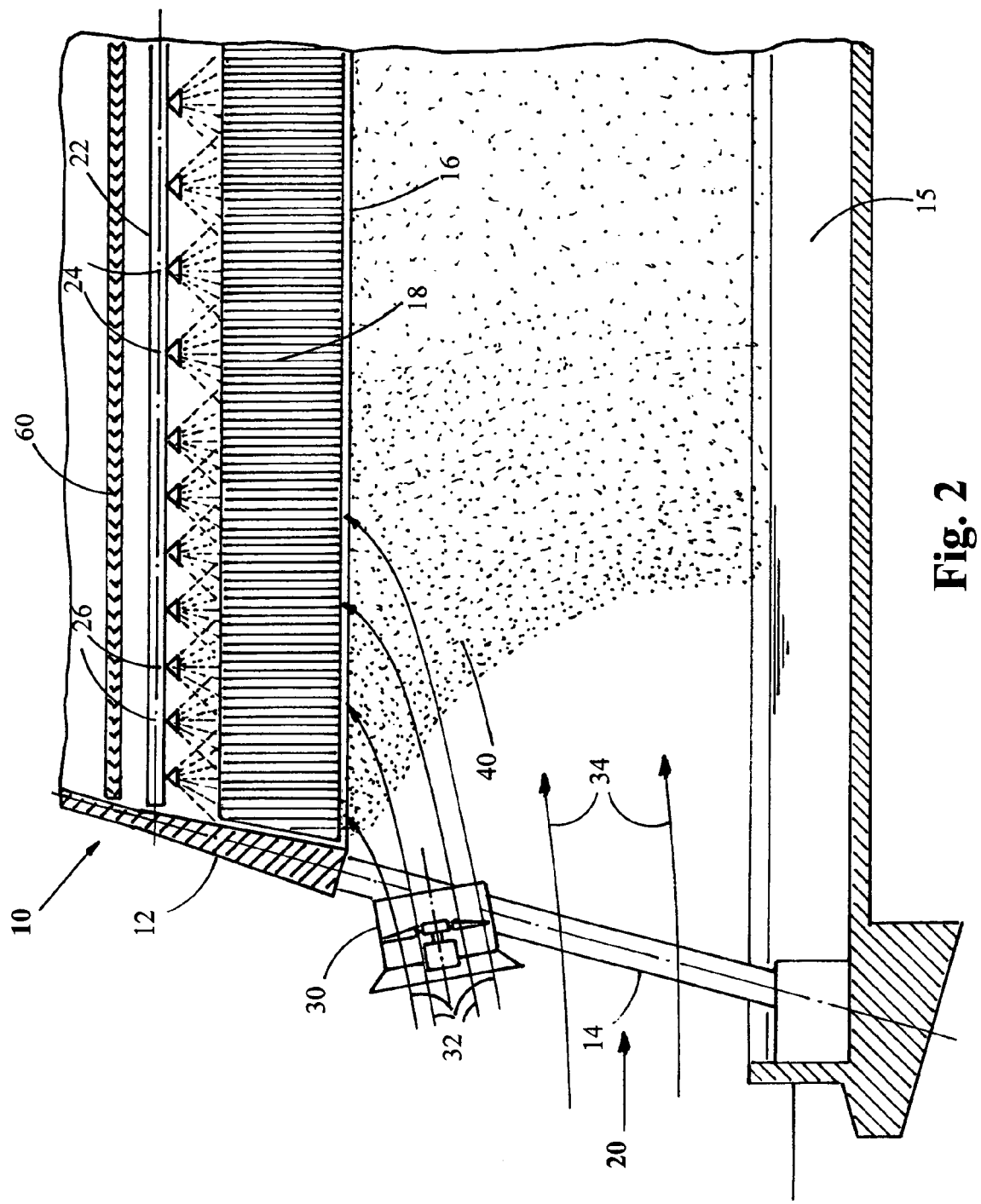
FIG. 2 shows a sectional side view of part of the cooling tower of FIG. 1.

When it is desired to provide forced draft cooling to the perimeter zone of the fill 18, the fans 30 are operated such that air 32 is discharged through the tower opening 20 into the shell 12 as depicted in FIG. 2.

Air discharge 32 has the effect of blowing the fine rain droplets 40 falling from the perimeter zone of the fill 18 away from the tower opening 20, deeper into the tower 12 thereby eliminating external wind blow-out.

Inlet hot water 50 is fed into the cooling tower 12 via an inlet duct, through a riser to distribution pipes 22 arranged above the packing or fill 18 as depicted in FIGS. 1 and 2. To fully utilize the additional air provided by the fans 30 around the perimeter zone of the fill 18, the amount of hot water sprayed on to the fill 18 in the perimeter zone, is increased. This can be achieved by increasing the number of sprayers 26 in the perimeter zone, or by increasing the nozzle size of sprayers 26 in the perimeter zone. Because hot water distribution is increased in the perimeter zone, hot water distribution through sprayers 24 is automatically reduced in the remaining inner area of the cooling tower packing or fill.

Drift eliminators 60 above the distribution pipe 22 may be provided to intercept fine water particles entrained in the air 32 and 34 leaving the fill zone, thereby minimizing drift loss.

Figure 6:
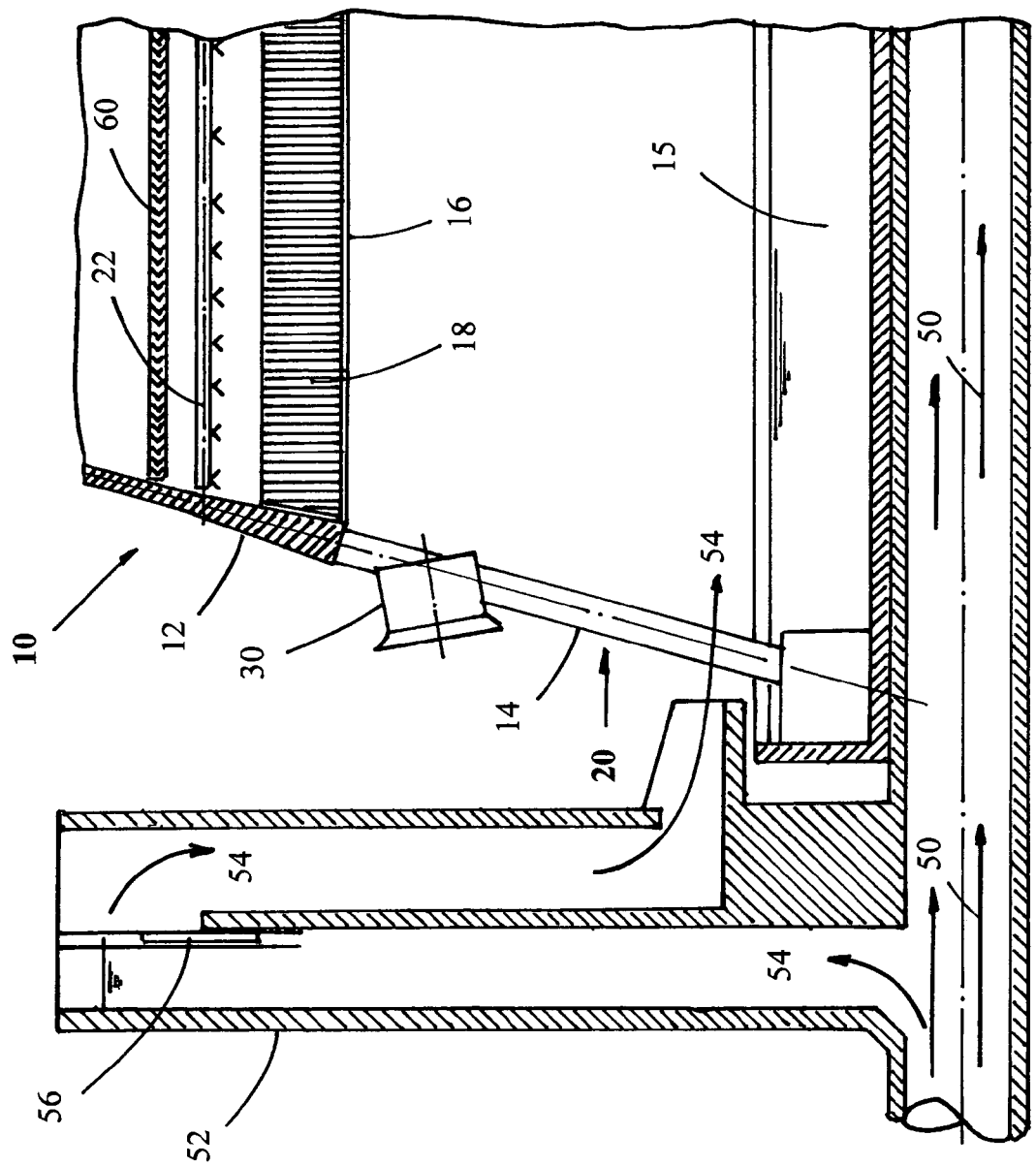
FIG. 6 shows a sectional side view of part of a natural draft cooling tower of FIGS. 1 and 2, incorporating a hot water by-pass.

Hot water by-pass 54 is diverted from the inlet hot water 50 via a hot water by-pass tower 52 as depicted in FIG. 6. Hot water by-pass 54 overflows adjustable gate 56 at the top of the hot water by-pass tower 52 thereby maintaining pumping head on the circulating water pumps. Hot water by-pass quantity is controlled by adjusting the height of gate 56. Control of gate 56 can be automated and controlled by the returned cold water temperature to the condenser. The ambient air temperature is measured by first temperature sensor 21 positioned in the annular inlet air opening 20 and the mixed cold water temperature in sump outlet 17 is measured by second temperature sensor 19.

Figure 7:
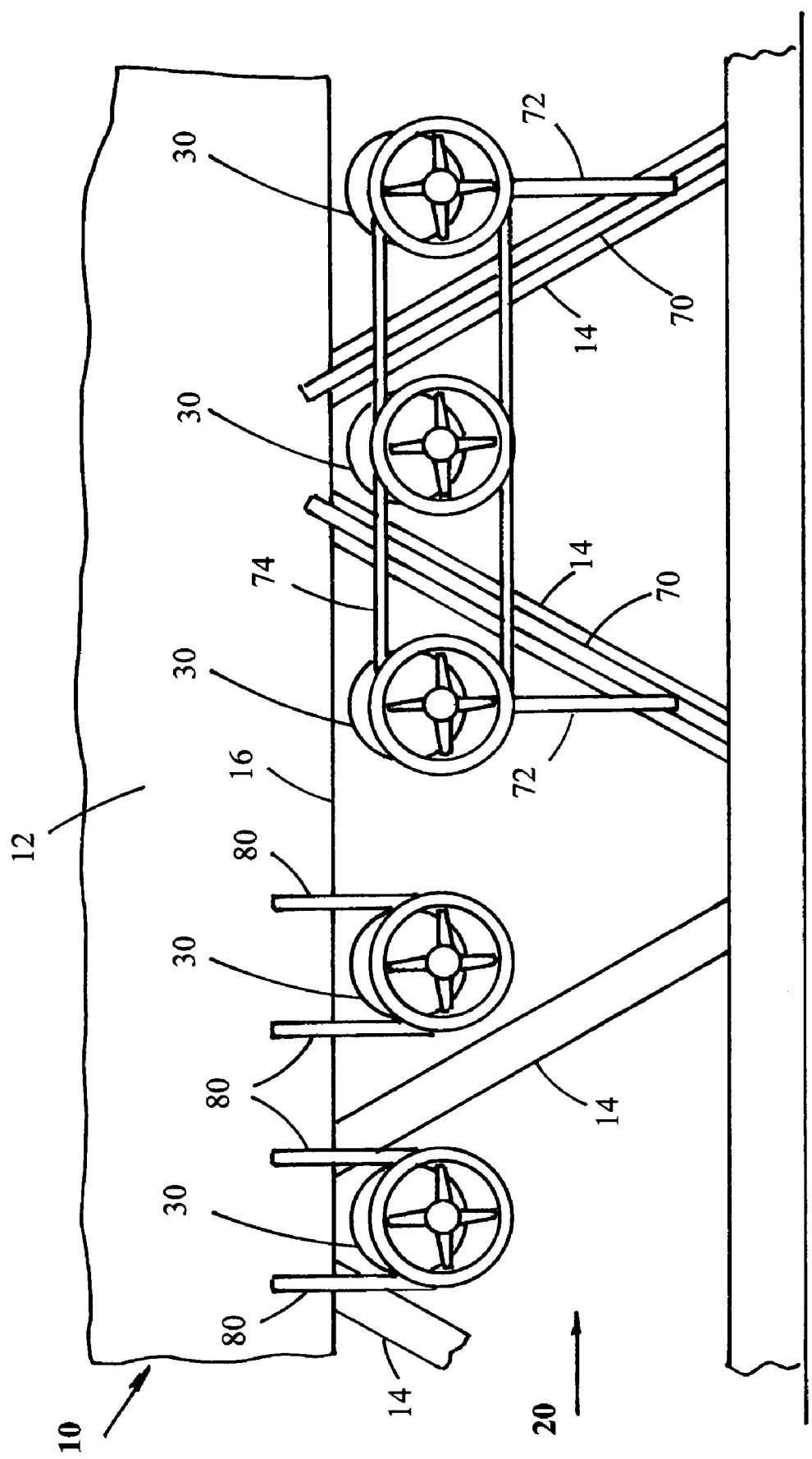
FIG. 7 shows an elevation view on the annular air opening and possible means of supporting the fans within the air openings.

FIG. 7 shows possible fan support means. Fans 30 can be supported in their desired position in the air opening 20 on galvanized structural steel support members 70, 72 and 74. Alternatively, fans 30 could be suspended from the lower edge 16 of the shell 12 by means of galvanized structural steel hangers 80.

The present invention provides a cost effective means for improving the operation of a wet natural draft cooling tower. Not only does it provide a means of improving the performance of the tower during the hottest periods of the year, by enabling the tower to return lower cold water temperatures, but it also provides a means of reducing evaporation losses during the cooler periods of the year. Another advantage of the invention is that with the positioning of the forced draft fans at the top of the air opening, water losses arising from blow-out can be reduced or eliminated. A further advantage of the invention is that in forced draft operating mode, external wind effect on the performance of the tower will be reduced or eliminated. A yet further advantage of the invention is that with an increase in heat load around the tower perimeter and with the hot water by-pass, an effective means of combating ice formation around the tower perimeter, during extreme winter conditions, is provided.

The inventor believes that it will be a relatively simple matter to convert an existing cooling tower through the addition of a plurality of small to moderate diameter forced draft air injector fans, to provide a hot water by-pass and to increase the water loading through the fill at the perimeter zone thereof The invention accordingly also extends to a method of enhancing cooling performance and reducing liquid loss of a natural draft cooling tower in this way.

From the foregoing description of the present invention, it will be appreciated by those skilled in the art that the objects and advantages hereinbefore set out are fully accomplished.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. An improved natural draft cooling tower comprising:
a cooling tower shell having at its upper end an open air discharge and its lower edge supported on columns above a cold liquid sump to provide an annular inlet air opening such that air can enter the cooling tower;
an air liquid contact packing assembly within the tower shell;
a hot liquid distribution means above the packing assembly; and
a plurality of air injector fans positioned below the shell lower edge within the annular inlet air opening, wherein the fans are upwardly tilted to direct injected air into a perimeter zone of the air liquid contact packing assembly.

2. The improved natural draft cooling tower of claim 1, further comprising a hot liquid by-pass means enabling some of the hot liquid to be diverted from the hot liquid distribution means directly into said cold liquid sump.

3. The improved natural draft cooling tower of claim 2, wherein the hot liquid by-pass means comprises a hot liquid by-pass tower having an adjustable gate to vary the flow of hot liquid diverted from the hot liquid distribution means directly into said cold liquid sump.

4. The improved natural draft cooling tower of claim 3, further comprising a first temperature sensor for measuring the ambient air temperature, and a second temperature sensor for measuring a mixed cold liquid temperature, said mixed cold liquid temperature being the temperature of the liquid in the cold liquid sump when some of the hot liquid from the hot liquid distribution means has been diverted directly into the cold liquid sump.

5. The improved natural draft cooling tower of claim 4, wherein a position of the adjustable gate and the flow of hot liquid diverted from the hot liquid distribution means above the packing, directly into said cold liquid sump are varied in response to the mixed cold liquid temperature measured by the second temperature sensor.

6. The improved natural draft cooling tower of claim 1, wherein the air injector fans are between 3 ft and 13 ft in diameter.

7. The improved natural draft cooling tower of claim 1, wherein the air injector fans are between 3 ft and 7 ft in diameter.

8. The improved natural draft cooling tower claim 1, wherein the air injector fans are between 7 ft and 13 ft in diameter.

9. The improved natural draft cooling tower claim 1, wherein the air injector fans are positioned between the columns near the top of the annular inlet air opening and below the air liquid contact packing assembly within the tower shell.

10. The improved natural draft cooling tower of claim 1, wherein between 1 and 3 air injector fans are positioned between each pair of columns.

11. The improved natural draft cooling tower of claim 1, wherein between 1 and 3 air injector fans are positioned between each second or third pair of columns.

12. The improved natural draft cooling tower of claim 1, further comprising drift eliminators in the tower shell above the hot liquid distribution means to minimize drift loss.

13. A method of enhancing cooling performance and reducing liquid losses of a natural draft cooling tower, said cooling tower comprising:
a shell for a natural draft cooling tower having at its upper end an open air discharge and its lower edge supported on columns above a cold liquid sump to provide an annular inlet air opening such that air can enter said cooling tower, an air liquid contact packing assembly within the tower shell and a hot liquid distribution means above the packing assembly, said method including the steps of:
positioning a plurality of air injector fans below the shell lower edge within said annular inlet air opening; and
upwardly tilting the plurality of air injector fans to direct injected air into a perimeter zone of the air liquid contact packing assembly.

14. The method of claim 13, further including the step of diverting some of the hot liquid from said hot liquid distribution means above the packing directly into said cold liquid sump via a hot liquid by-pass means.

15. The method of claim 14, further including the steps of:
measuring the ambient air temperature with a first temperature sensor; reducing a proportion of the hot liquid diverted from the hot liquid distribution means above the packing directly into said cold liquid sump via a hot liquid by-pass means to zero when the ambient temperature is above an upper threshold temperature;
reducing the air injected into the perimeter zone of said the air liquid contact packing assembly by the plurality of air injector fans to zero when the ambient temperature is below a lower threshold temperature; and operating the natural draft cooling tower with both the plurality of air injector fans and the hot liquid by-pass means active when the ambient temperature is between the lower and upper threshold temperatures.

16. The method of claim 15, further including the steps of:

measuring a mixed cold liquid temperature with a second temperature sensor, said mixed cold liquid temperature being the temperature of the liquid in the cold liquid sump when some of the hot liquid from the said hot liquid distribution means above the packing, has been diverted directly into the cold liquid sump; and varying the proportion of the hot liquid diverted from the hot liquid distribution means above the packing directly into said cold liquid sump via a hot liquid by-pass means and the amount of air injected into the perimeter zone of said the air liquid contact packing assembly by the plurality of air injector fans depending on the ambient air temperature and/or the mixed cold liquid temperature.

17. The method of claim 13, further including the steps of increasing the distribution of hot liquid within the tower above the perimeter zone of the packing assembly and decreasing the hot liquid distribution above the remaining packing assembly within the tower.

18. The method of claim 17, wherein the distribution of hot liquid within the tower above the perimeter zone of the packing assembly is increased by increasing the number of sprayers of the hot liquid distribution means in the perimeter zone.

19. The method of claim 17, wherein the distribution of hot liquid within the tower above the perimeter zone of the packing assembly is increased by increasing the size of nozzles of sprayers of the hot liquid distribution means in the perimeter zone.

20. The method of claim 13, further including the step of increasing air through the perimeter zone of the packing assembly with air injected by the air injector, thereby maintaining an optimum ratio of air to hot liquid and increasing the natural draft to match the increased air from the fan injectors.

21. The method of claim 13, further including the step of creating positive air pressure via the air injector fans to overcome negative air pressure caused by external wind around a leeward side of the tower thereby preventing liquid loss through air by-pass, reduction of natural draft and/or blow-out.

22. The method of claim 17, wherein said steps of increasing the distribution of the hot liquid above the perimeter zone and decreasing the distribution of hot liquid above the remaining packing assembly result in reduced air resistance thereby increasing natural draft and the ratio of air to hot water in the remaining packing.

23. The method of claim 17, further including the step of reducing the hot liquid from said hot liquid distribution means above the remaining packing assembly to increase the natural draft through said cooling tower thereby increasing the ratio of air to hot liquid and reducing liquid losses through evaporation.

* * * * *